US007870719B2

(12) United States Patent
Lee et al.

(10) Patent No.: US 7,870,719 B2
(45) Date of Patent: Jan. 18, 2011

(54) PLASMA ENHANCED RAPIDLY EXPANDED GAS TURBINE ENGINE TRANSITION DUCT

(75) Inventors: Ching-Pang Lee, Cincinnati, OH (US); Aspi Rustom Wadia, Loveland, OH (US); David Glenn Cherry, Loveland, OH (US); Scott Michael Carson, Mason, OH (US)

(73) Assignee: General Electric Company, Schenectady, NY (US)

( * ) Notice: Subject to any disclaimer, the term of this patent is extended or adjusted under 35 U.S.C. 154(b) by 537 days.

(21) Appl. No.: 11/580,788

(22) Filed: Oct. 13, 2006

(65) Prior Publication Data

US 2010/0251696 A1   Oct. 7, 2010

(51) Int. Cl.
*F02H 1/00* (2006.01)
(52) U.S. Cl. ..................... 60/202; 313/362.1
(58) Field of Classification Search .......... 60/202; 313/359.1, 362.1
See application file for complete search history.

(56) References Cited

U.S. PATENT DOCUMENTS

| 2,763,125 | A | * | 9/1956 | Kadosch et al. | 60/230 |
| 3,293,852 | A | * | 12/1966 | Galli et al. | 60/202 |
| 3,678,306 | A | * | 7/1972 | Garnier et al. | 310/11 |
| 5,320,309 | A | * | 6/1994 | Nosenchuck et al. | 244/205 |
| 5,966,452 | A | * | 10/1999 | Norris | 381/71.1 |
| 6,619,030 | B1 | | 9/2003 | Seda et al. | |
| 6,708,482 | B2 | | 3/2004 | Seda | |
| 6,732,502 | B2 | | 5/2004 | Seda et al. | |
| 6,805,325 | B1 | * | 10/2004 | Malmuth et al. | 244/205 |
| 2005/0034464 | A1 | * | 2/2005 | Gonzalez | 60/801 |
| 2006/0005545 | A1 | | 1/2006 | Samimy et al. | |
| 2007/0126292 | A1 | * | 6/2007 | Lugg | 310/11 |
| 2008/0115477 | A1 | * | 5/2008 | Samimy et al. | 60/39.5 |

FOREIGN PATENT DOCUMENTS

| DE | 102005046721 B3 | * | 10/2006 |
| EP | 1906136 A1 | | 9/2008 |
| WO | WO2005/114013 A1 | | 12/2005 |

OTHER PUBLICATIONS

European Search Report and Opinion, Application No. EP07254056, Mar. 12, 2009, 10 pages.

(Continued)

*Primary Examiner*—Michael Cuff
*Assistant Examiner*—Phutthiwat Wongwian
(74) *Attorney, Agent, or Firm*—William Scott Andes; Steven J. Rosen

(57) ABSTRACT

A plasma enhanced rapidly expanded duct system includes a gas turbine engine inter-turbine transition duct having radially spaced apart conical inner and outer duct walls extending axially between a duct inlet and a duct outlet. A conical plasma generator produces a conical plasma along the outer duct wall. An exemplary embodiment of the conical plasma generator is mounted to the outer duct wall and including radially inner and outer electrodes separated by a dielectric material. The dielectric material is disposed within a conical groove in a radially inwardly facing surface of the outer duct wall. An AC power supply is connected to the electrodes to supply a high voltage AC potential to the electrodes.

23 Claims, 4 Drawing Sheets

OTHER PUBLICATIONS

AIAA 2007-647, Stereo PIV of a Turbine Tip Clearance Flow with Plasma Actuation, Daniel K. Van Ness II, Thomas C. Corke, and Scott C. Morris, 22 pages.
AIAA 2006-20, "Turbine Blade Tip Leakage Flow Control by Partial Squealer Tip and Plasma Actuators", Travis Douville, Julia Stephens, Thomas Corke, and Scott Morris, 18 pages.
AIAA 2005-782, "Tip Clearance Control Using Plasma Actuators", Scott C. Morris, Thomas C. corke, Daniel Van Ness, Julia Stephens, and Travis Douville, 8 pages.
XP007907306, "Active Flow Control in Turbomachinery Using Phased Plasma Actuators", B. Goksel and I. Rechenberg, 2 pages.
XP009112404, "Turbine Tip Clearance Flow Control using Plasma Actuators", Daniel K. Van Ness II, Thomas Co. Corke, and Scott C. Morris, 12 pages.
Science Direct, "SDBD plasma enhanced aerodynamics: concepts optimization and applications", Thomas C. Corke, Martiqua L. Post, and Dmitry M. Orlov, 26 pages.
XP007907356, "Plasma (physics)", From Wikipedia, 16 pages.
XP007907353, "Dielectric barrier discharge", From Wikipedia, 2 pages.
"Overview of Plasma Flow Control: Concepts, Optimization, and Applications", Thomas C. Corke and Martiqua L. Post, 43rd AIAA Aerospace Sciences Meeting and Exhibit, Jan. 10-13, 2005, Reno, Nevada, AIAA 2005-563, 15 pages.
"Plasma Control of Boundary Layer Using Low-Temperature Non-Equilibrium Plasma of Gas Discharge", D.F. Opaits, D.V. Rouspassov, S.M. Starikovskaia, A. Yu. Starikovskii, I.N. Zavialov, and S.G. Saddoughi, 43rd AIAA Aerospace Sciences Meeting and Exhibit, Jan. 10-13, 2005, Reno, Nevada, AIAA 2005-1180, 6 pages.
"Demonstration of Separation Delay With Glow-Discharge Plasma Actuators", Lennart S. Hultgren and David E. Ashpis, 41st AIAA Aerospace Sciences Meeting and Exhibit, Jan. 6-9, 2003, Reno, Nevada, AIAA 2003-1025, 10 pages.
"Unsteady Plasma Actuators for Separation Control of Low-Pressure Turbine Blades", Junhui Huang, Thomas C. Corke and Flint O. Thomas, AIAA Journal, vol. 44, No. 7, Jul. 2006, pp. 1477-1487.
"Control of Separation in Turbine Boundary Layers", R.B. Rivir, R. Sondergaard, J.P. Bons, and N. Yurchenko, 2nd AIAA Flow Control Conference, Jun. 28-Jul. 1, 2004, Portland, Oregon, 16 pages.
"Plasma Flow Control Optimized Airfoil", Thomas C. Corke, Benjamin Mertz, and Mehul P. Patel, 44th AIAA Aerospace Sciences Meeting and Exhibit, Jan. 9-12, 2006, Reno, Nevada, AIAA 2006-1208, 13 pages.
"Control of Transitional and Turbulent Flows Using Plasma-Based Actuators", Miguel R. Visbal, Datta V. Gaitonde, and Subrata Roy, 36th AIAA Fluid Dynamics Conference and Exhibit, Jun. 5-8, 2006, San Francisco, California, AIAA 2006-3230, 22 pages.
"AC and Pulsed Plasma Flow Control", R. Rivir, A. White, C. Carter, B. Ganguly, J. Jacob, A. Forelines, and J. Crafton, 42nd AIAA Aerospace Sciences Meeting and Exhibit, Jan. 5-8, 2004, Reno, Nevada, AIAA 2004-847, 9 pages.
"Effects of Plasma Induced Velocity on Boundary Layer Flow", Brian E. Balcer, Milton E. Franke, and Richard B. Rivir, 44th AIAA Aerospace Sciences Meeting and Exhibit, Jan. 9-12, 2006, Reno, Nevada, AIAA 2006-875, 12 pages.
"Flow Control Using Plasma Actuators and Linear / Annular Plasma Synthetic Jet Actuators", Arvind Santhanakrishan, Jamey D. Jacob, and Yildirim B. Suzen, 3rd AIAA Flow Control Conference, Jun. 5-8, 2006, San Francisco, California, AIAA 2006-3033, 31 pages.
"Turbulent Drag Reduction by Surface Plasma through Spanwise Flow Oscillation", Timothy N. Jukes, Kwing-So Choi, Graham A. Johnson, and Simon J. Scott, 3rd AIAA Flow Control Conference, Jun. 5-8, 2006, San Francisco, California, AIAA 2006-3693, 14 pages.

* cited by examiner

PLASMA ENHANCED RAPIDLY EXPANDED GAS TURBINE ENGINE TRANSITION DUCT

BACKGROUND OF THE INVENTION

1. Field of the Invention

The invention relates to aircraft gas turbine engines and, particularly, to transition ducts between low pressure and high pressure turbines of such engines.

2. Description of Related Art

A gas turbine engine of the turbofan type generally includes a forward fan and a booster or low pressure compressor, a middle core engine, and a low pressure turbine which powers the fan and booster or low pressure compressor. The core engine includes a high pressure compressor, a combustor and a high pressure turbine in a serial flow relationship. The high pressure compressor and high pressure turbine of the core engine are interconnected by a high pressure shaft. The high pressure compressor, turbine, and shaft essentially form the high pressure rotor. High pressure air from the high pressure compressor is mixed with fuel in the combustor and ignited to form a high energy gas stream. The gas stream flows through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Most of the thrust produced is generated by the fan. Marine or industrial gas turbine engines have low pressure turbines which powers generators, ship propellers, pumps and other devices while turboprops engines use low pressure turbines to power propellers usually through a gearbox.

Large modern commercial turbofan engines have higher operating efficiencies with higher by pass ratio configurations and large transition ducts between the low pressure and high pressure turbines. In order to improve efficiency of the low pressure turbine, a gas flowpath in a transition duct between the high and low pressure turbines is expanded to a greater radius. It is greatly desirable to have a transition duct with a shortest length as possible in order to save engine weight. However, if the axial length of the transition duct is too short it becomes a rapidly expanded duct that causes the flow near the boundary layer to separate from a radially outer wall of the transition duct and cause undesirable pressure losses. It is desirable to have a design that can prevent the flow separation and still have a rapidly expanded and short transition duct.

SUMMARY OF THE INVENTION

A plasma enhanced rapidly expanded duct system includes a gas turbine engine inter-turbine transition duct having a duct inlet and a duct outlet aft and downstream of the duct inlet, radially spaced apart conical radially inner and outer duct walls extending axially between the duct inlet and the duct outlet, and a conical plasma generator for producing a plasma along the outer duct wall.

In an exemplary embodiment of the system, the conical plasma generator is mounted to the outer duct wall. The conical plasma generator includes radially inner and outer electrodes separated by a dielectric material. An AC power supply is connected to the electrodes to supply a high voltage AC potential to the electrodes. The dielectric material is disposed within a conical groove in a radially inwardly facing surface of the outer duct wall.

In another exemplary embodiment of the system, the inter-turbine transition duct is circumscribed about an engine centerline axis, an inlet outer radius extends from the centerline axis to the outer duct wall at the duct inlet, an exit outer radius extends from the centerline axis to the outer duct wall at the duct outlet, an inlet radial height extends between the inner and outer duct walls at the duct inlet, and a length of the duct extending between the duct inlet and the duct outlet. A difference is defined between the inlet outer radius and the exit outer radius. The difference divided by the inlet radial height is greater than 0.375 multiplied by the length divided by the inlet radial height.

In yet another exemplary embodiment of the system, there is an inlet area extending between the inner and the outer duct walls at the duct inlet, an exit area extending between the inner and the outer duct walls at the duct outlet, and an inlet radial height extending between the inner and outer duct walls at the duct inlet. An area ratio, equal to the exit area divided by the inlet area, is greater than 0.2067 multiplied by the length divided by the inlet radial height.

A method for operating a gas turbine engine having a plasma enhanced rapidly expanded duct system includes forming a plasma along a conical outer duct wall of a gas turbine engine inter-turbine transition duct of the plasma enhanced rapidly expanded duct system.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
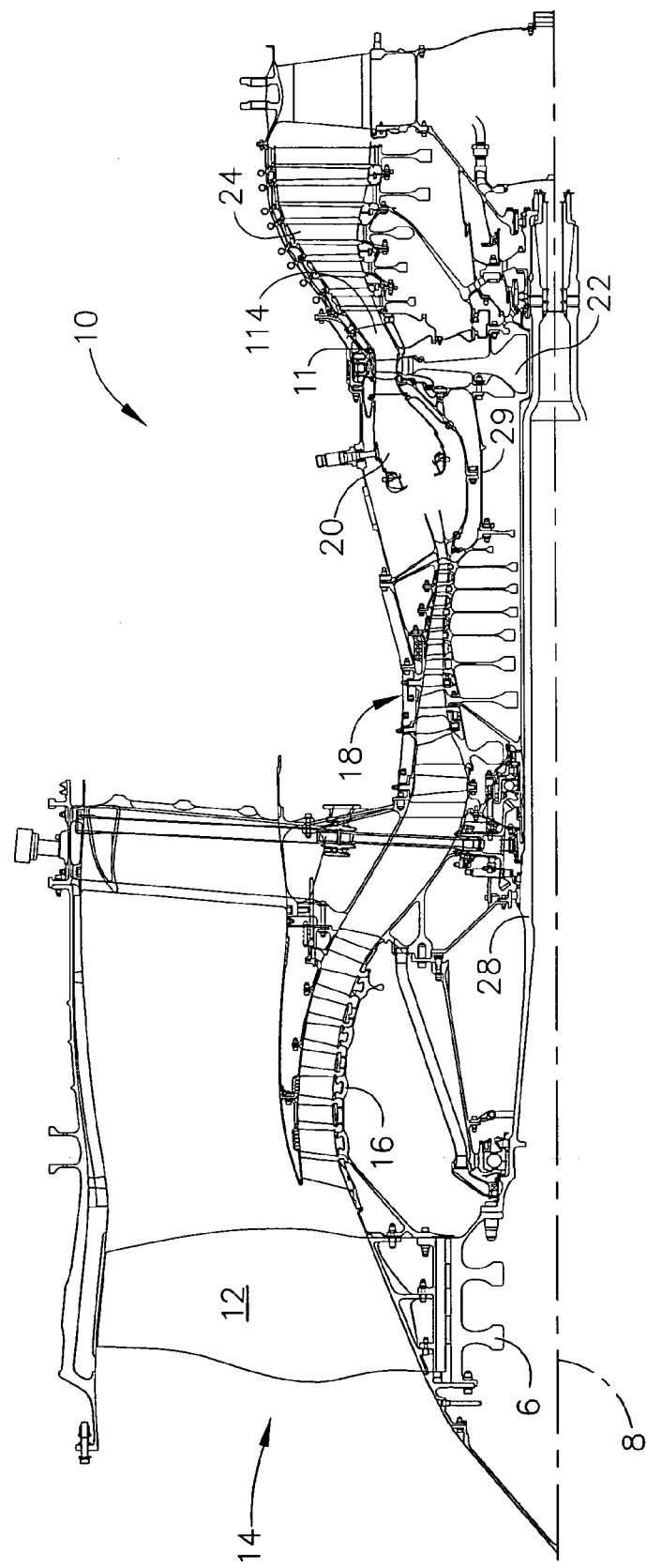
FIG. 1 is a longitudinal, sectional view illustration of exemplary embodiment of an aircraft gas turbine engine with a plasma enhanced rapidly expanded duct system for an inter-turbine transition duct between high and low pressure turbine sections of the engine.

Illustrated in FIG. 1 is an exemplary turbofan gas turbine engine 10 circumscribed about an engine centerline axis 8 and having a fan 12 which receives ambient air 14, a booster or low pressure compressor (LPC) 16, a high pressure compressor (HPC) 18, a combustor 20 which mixes fuel with the air 14 pressurized by the HPC 18 for generating combustion gases which flow downstream through a high pressure turbine (HPT) 22, and a low pressure turbine (LPT) 24 from which the combustion gases are discharged from the engine 10. The HPT 22 is joined to the HPC 18 to substantially form a high pressure rotor 29. A low pressure shaft 28 joins the LPT 24 to both the fan 12 and the low pressure compressor 16. The second or low pressure shaft 28 which is at least in part rotatably disposed co-axially with and radially inwardly of the first or high pressure rotor.

Figure 2:
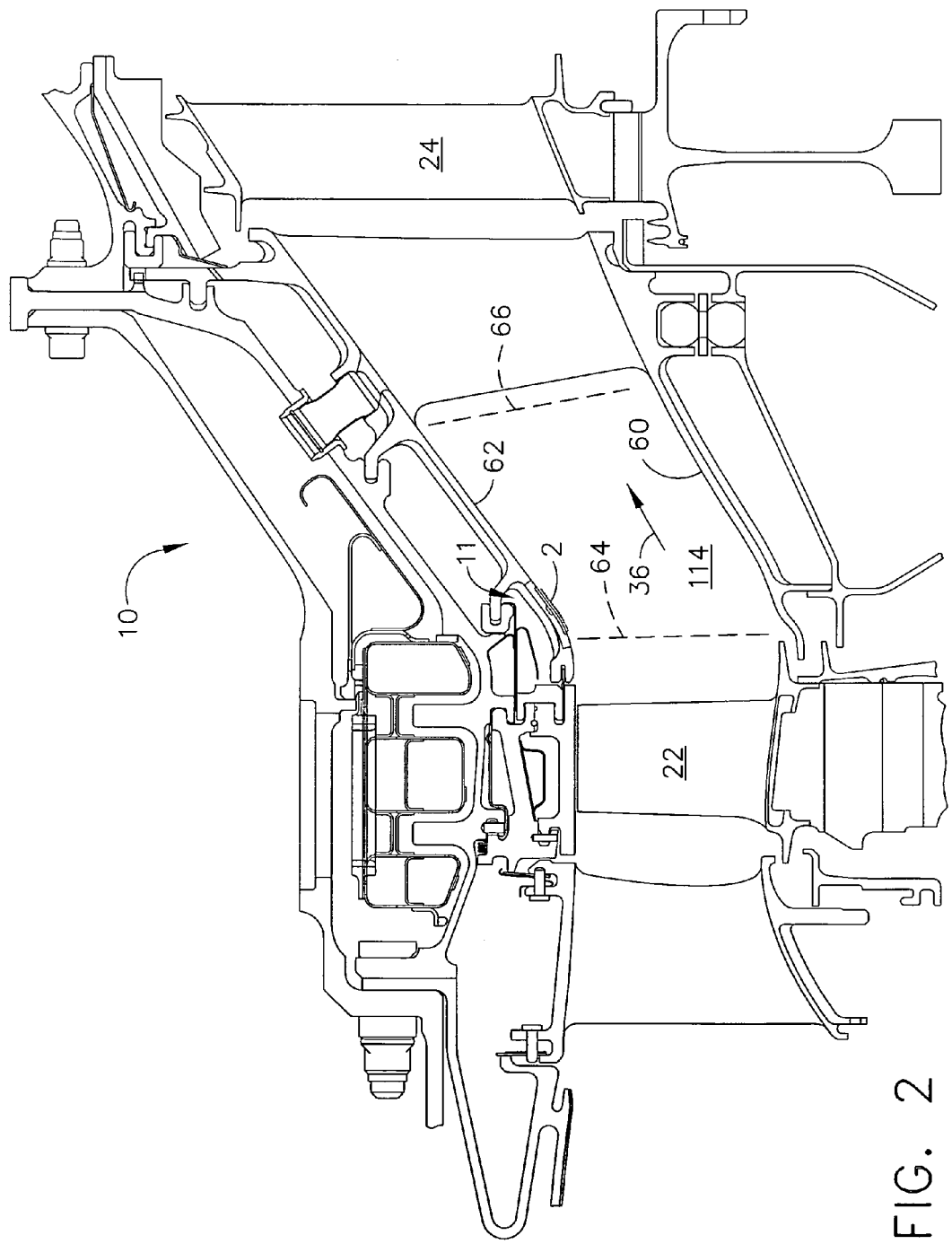
FIG. 2 is an enlarged view of the inter-turbine transition duct with a plasma generator of the plasma enhanced rapidly expanded duct system illustrated in FIG. 1.
Figure 3:
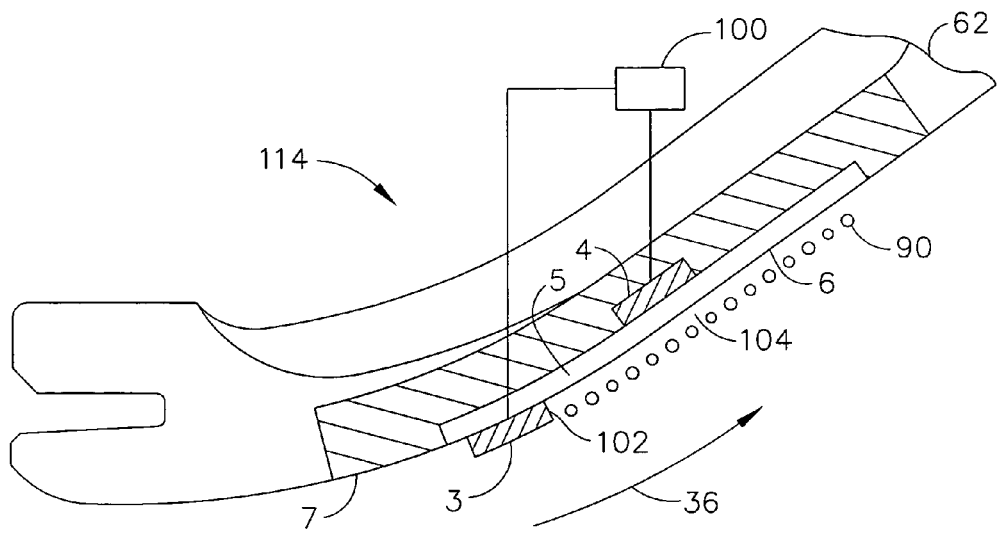
FIG. 3 is an enlarged view of the plasma generator illustrated in FIG. 3.
Figure 4:
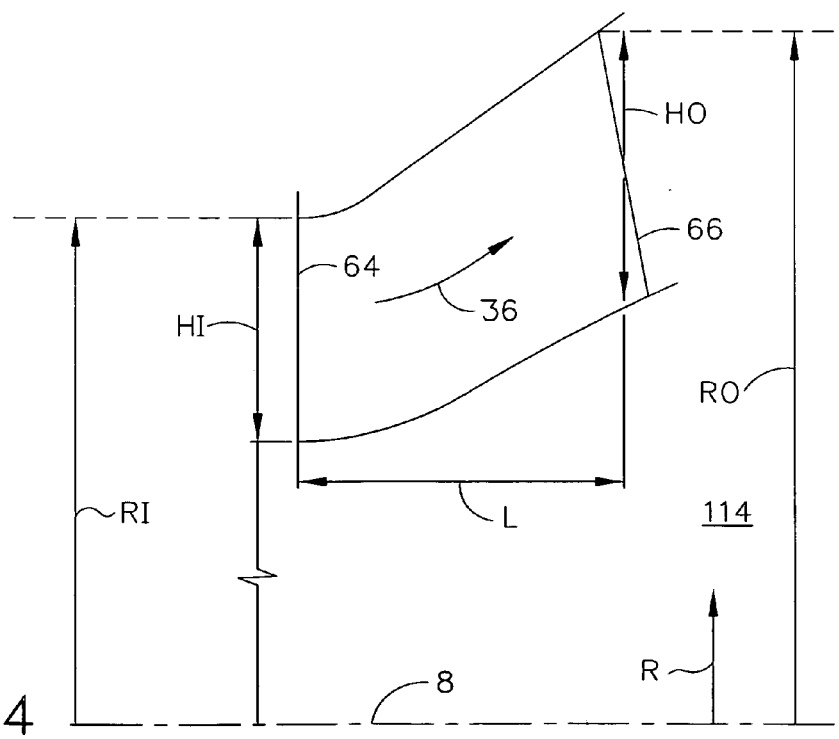
FIG. 4 is schematic illustration of the inter-turbine transition duct in FIG. 2.

Illustrated in FIGS. 2 and 3 is a plasma enhanced rapidly expanded duct system 11 includes an inter-turbine transition duct 114 disposed between the high pressure turbine 22 and the low pressure turbine 24 includes radially spaced apart conical radially inner and outer duct walls 60 and 62, respectively. Referring to FIGS. 2 and 4, the transition duct 114 has a duct inlet 64 and a duct outlet 66 aft and downstream of the duct inlet. The duct inlet 64 has an inlet radial height HI between the inner and outer duct walls 60 and 62 and the duct outlet 66 has an outlet radial height HO between the inner and outer duct walls 60 and 62. Radial heights are measured along a radius of the engine normal to the engine centerline axis 8. The outlet height HO is substantially greater than inlet height HI.

Referring to FIG. 3, the plasma enhanced rapidly expanded duct system 11 includes a conical plasma generator 2 used to produce a conical plasma 90 along the outer duct wall 62. An exemplary embodiment of the conical plasma generator 2 illustrated herein has the plasma generator 2 is mounted to the outer duct wall 62 at or near the duct inlet 64. The conical plasma generator 2 includes radially inner and outer electrodes 3, 4 separated by a dielectric material 5. The dielectric material 5 is disposed within a conical groove 6 in a radially inwardly facing surface 7 of the outer duct wall 62. An AC power supply 100 is connected to the electrodes to supply a high voltage AC potential to the electrodes.

When the AC amplitude is large enough, the air ionizes in a region of largest electric potential forming a plasma 90. The plasma 90 generally begins at an edge 102 of the radially inner electrode 3 which is exposed to the air and spreads out over an area 104 projected by the outer electrode 4 which is covered by the dielectric material 5. The plasma 90 (ionized air) in the presence of an electric field gradient produces a force on the ambient air located radially inwardly of the plasma 90 inducing a virtual aerodynamic shape that causes a change in the pressure distribution over the radially inwardly facing surface 7 of the outer duct wall 62.

The air near the electrodes is weakly ionized, and there is little or no heating of the air. The change in the pressure distribution prevent the flow separation when the conical plasma generator 2 is on. It is known that airfoils using plasma generators have been shown to prevent flow separation over the airfoils.

Design practices currently incorporate limitations to avoid separation of airflow 36 in the transition duct 114 involve the geometry of transition duct. One such limitation is (DR/HI) being less than 0.375 (L/HI). Referring to FIG. 4, the inlet radial height HI is the distance between the inner and outer duct walls 60 and 62 at the duct inlet 64 and L is a length between the duct inlet 64 and the duct outlet 66. DR is a difference between an inlet outer radius RI of the outer duct wall 62 at the duct inlet 64 and an exit outer radius RO of the outer duct wall 62 at the duct outlet 66 of the transition duct 114. Radii R are measured from and are normal to the engine centerline axis 8. When (DR/HI) greater than 0.375 (L/HI), the airflow 36 in the transition duct 114 is more likely to separate and cause significant pressure losses in the transition duct 114. Thus, one embodiment of the transition duct 114 is constructed such that the difference (DR) divided by the inlet radial height (HI) is greater than 0.375 multiplied by the length (L) divided by the inlet radial height (HI).

Figure 5:
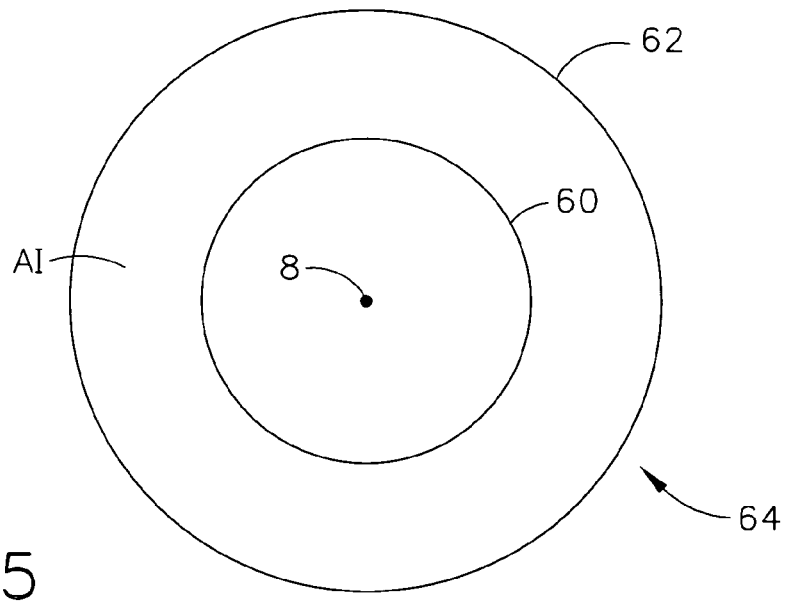
FIG. 5 is schematic illustration of an inlet of the inter-turbine transition duct in FIG. 4.
Figure 6:
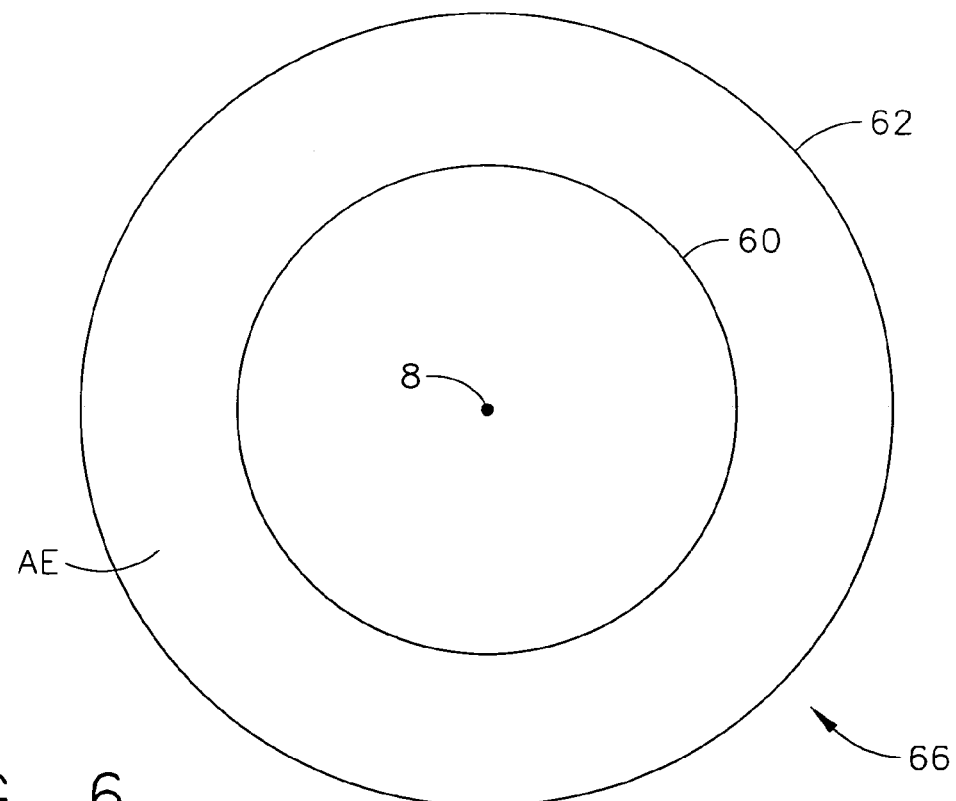
FIG. 6 is schematic illustration of an outlet of the inter-turbine transition duct in FIG. 4.

Another design practice limits a parameter of area ratio AR which equals (exit area AE)/(inlet area AI) of the transition duct 114. As illustrated in FIGS. 4, 5 and 6, the exit area AE is an annulus between the inner and outer duct walls 60 and 62 at the duct outlet 66 and the inlet area AI is an annulus between the inner and outer duct walls 60 and 62 at the duct inlet 64. When AR greater than 0.2067 (L/HI), the airflow 36 is also more likely to separate and cause significant pressure losses. The plasma enhanced rapidly expanded duct system 11 allows gas turbine engines and particularly aircraft gas turbine engines to be designed and constructed without flow separation and have (DR/HI) greater than 0.375 (L/HI) or AR greater than 0.2067 (L/HI).

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A plasma enhanced rapidly expanded duct system comprising:
   a gas turbine engine inter-turbine transition duct between two turbines having a duct inlet and a duct outlet aft and downstream of the duct inlet, radially spaced apart conical radially inner and outer duct walls extending axially between the duct inlet and the duct outlet, and
   a conical plasma generator for producing a conical plasma along the outer duct wall.

2. A system as claimed in claim 1 further comprising the conical plasma generator being mounted to the outer duct wall.

3. A system as claimed in claim 2 further comprising the conical plasma generator including radially inner and outer electrodes separated by a dielectric material.

4. A system as claimed in claim 3 further comprising an AC power supply connected to the electrodes to supply a high voltage AC potential to the electrodes.

5. A system as claimed in claim 4 further comprising the dielectric material disposed within a conical groove in a radially inwardly facing surface of the outer duct wall.

6. A system as claimed in claim 1 further comprising the dielectric material disposed within a conical groove in a radially inwardly facing surface of the outer duct wall.

7. A system as claimed in claim 6 further comprising the conical plasma generator being mounted to the outer duct wall.

8. A system as claimed in claim 7 further comprising the conical plasma generator including radially inner and outer electrodes separated by a dielectric material.

9. A system as claimed in claim 1 further comprising:
   the inter-turbine transition duct being circumscribed about an engine centerline axis,
   an inlet outer radius extending from the centerline axis to the outer duct wall at the duct inlet,
   an exit outer radius extending from the centerline axis to the outer duct wall at the duct outlet,
   an inlet radial height extending between the inner and outer duct walls at the duct inlet,
   a length of the duct extending between the duct inlet and the duct outlet,
   a difference between the inlet outer radius and the exit outer radius, and
   the difference divided by the inlet radial height being greater than 0.375 multiplied by the length divided by the inlet radial height.

10. A system as claimed in claim 9 further comprising the conical plasma generator being mounted to the outer duct wall.

11. A system as claimed in claim 10 further comprising the conical plasma generator including radially inner and outer electrodes separated by a dielectric material.

12. A system as claimed in claim 11 further comprising an AC power supply connected to the electrodes to supply a high voltage AC potential to the electrodes.

13. A system as claimed in claim 12 further comprising the dielectric material disposed within a conical groove in a radially inwardly facing surface of the outer duct wall.

14. A system as claimed in claim 1 further comprising:
the inter-turbine transition duct being circumscribed about an engine centerline axis,
an inlet area extending between the inner and the outer duct walls at the duct inlet,
an exit area extending between the inner and the outer duct walls at the duct outlet,
an inlet radial height extending between the inner and outer duct walls at the duct inlet,
a length of the duct extending between the duct inlet and the duct outlet,
an area ratio being equal to the exit area divided by the inlet area, and
the area ratio being greater than 0.2067 multiplied by the length divided by the inlet radial height.

15. A system as claimed in claim 14 further comprising the conical plasma generator being mounted to the outer duct wall.

16. A system as claimed in claim 15 further comprising the conical plasma generator including radially inner and outer electrodes separated by a dielectric material.

17. A system as claimed in claim 16 further comprising an AC power supply connected to the electrodes to supply a high voltage AC potential to the electrodes.

18. A system as claimed in claim 17 further comprising the dielectric material disposed within a conical groove in a radially inwardly facing surface of the outer duct wall.

19. A method for operating a gas turbine engine having a plasma enhanced rapidly expanded duct system including a gas turbine engine inter-turbine transition duct between two turbines having a duct inlet and a duct outlet aft and downstream of the duct inlet and radially spaced apart conical radially inner and outer duct walls extending axially between the duct inlet and the duct outlet, the method comprising forming a conical plasma along the conical outer duct wall of the gas turbine engine inter-turbine transition duct of the plasma enhanced rapidly expanded duct system.

20. A method as claimed in claim 19 further comprising the forming a conical plasma including supplying an AC potential to radially inner and outer electrodes separated by a dielectric material of the conical plasma generator.

21. A method as claimed in claim 20 further comprising the dielectric material being disposed within a conical groove in a radially inwardly facing surface of the outer duct wall.

22. A method as claimed in claim 19 further comprising:
the inter-turbine transition duct being circumscribed about an engine centerline axis,
an inlet outer radius extending from the centerline axis to the outer duct wall at the duct inlet,
an exit outer radius extending from the centerline axis to the outer duct wall at the duct outlet,
an inlet radial height extending between the inner and outer duct walls at the duct inlet,
a length of the duct extending between the duct inlet and the duct outlet,
a difference between the inlet outer radius and the exit outer radius, and
the difference divided by the inlet radial height being greater than 0.375 multiplied by the length divided by the inlet radial height.

23. A method as claimed in claim 19 further comprising:
the inter-turbine transition duct being circumscribed about an engine centerline axis,
an inlet area extending between the inner and the outer duct walls at the duct inlet,
an exit area extending between the inner and the outer duct walls at the duct outlet,
an inlet radial height extending between the inner and outer duct walls at the duct inlet,
a length of the duct extending between the duct inlet and the duct outlet,
an area ratio being equal to the exit area divided by the inlet area, and
the area ratio being greater than 0.2067 multiplied by the length divided by the inlet radial height.

\* \* \* \* \*